United States Patent [19]

Chamings et al.

[11] Patent Number: 5,018,783
[45] Date of Patent: May 28, 1991

[54] SLIDABLE, FOLDABLE, AND REMOVABLE VEHICLE SUNROOF

[75] Inventors: Antony W. Chamings, Mt. Clemens; Dennis W. Staley, Birmingham; Gary Mannke, Woodhaven, all of Mich.

[73] Assignee: ASC Incorporated, Southgate, Mich.

[21] Appl. No.: 409,152

[22] Filed: Sep. 19, 1989

[51] Int. Cl.$^5$ .............................. B60J 7/06
[52] U.S. Cl. ........................ 296/219; 296/217
[58] Field of Search ............ 296/219, 217, 224

[56] References Cited

U.S. PATENT DOCUMENTS

| | | | |
|---|---|---|---|
| 2,103,372 | 12/1937 | Lange | 296/219 |
| 2,985,483 | 5/1961 | Bishop et al. | 296/219 X |
| 2,991,094 | 7/1961 | Baier et al. | 296/219 X |
| 4,067,604 | 1/1978 | Mori | 296/217 |
| 4,143,907 | 3/1979 | Ireland | 296/219 X |
| 4,746,165 | 5/1988 | Fuerst et al. | 296/224 X |

FOREIGN PATENT DOCUMENTS

| | | | |
|---|---|---|---|
| 61629 | 3/1988 | Japan | 296/219 |
| 61630 | 3/1988 | Japan | 296/219 |
| 103733 | 5/1988 | Japan | 296/219 |

Primary Examiner—Margaret A. Focarino
Assistant Examiner—Gary C. Hoge
Attorney, Agent, or Firm—Harness, Dickey & Pierce

[57] ABSTRACT

A flexible fabric sunroof retracts by means of cable driven guide shoes driving a front header to the open position and thereby moving odd numbered position bows 3 and 5 along horizontal side tracks within the roof. Even numbered position bows 2, 4 and 6 are biased upwardly to lift the slack fabric above the roof plane during retraction. The fabric sunroof may be totally removed from the roof structure to provide for the largest possible roof opening by removal of a rear header attached to the rear roof frame and detachment of the front header from the guide shoes. A wind deflector is provided which is concealed within sunroof when in the closed position.

28 Claims, 7 Drawing Sheets

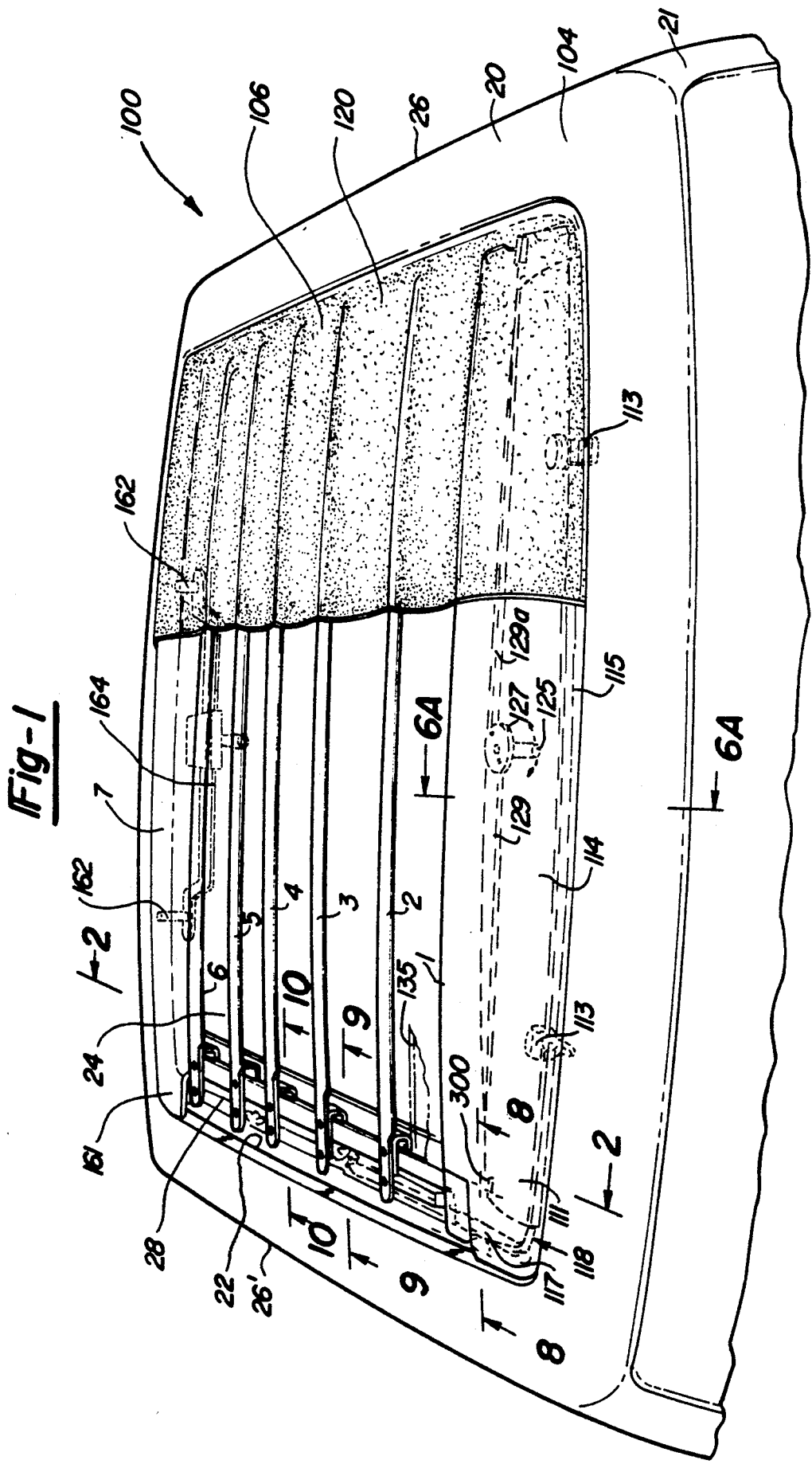

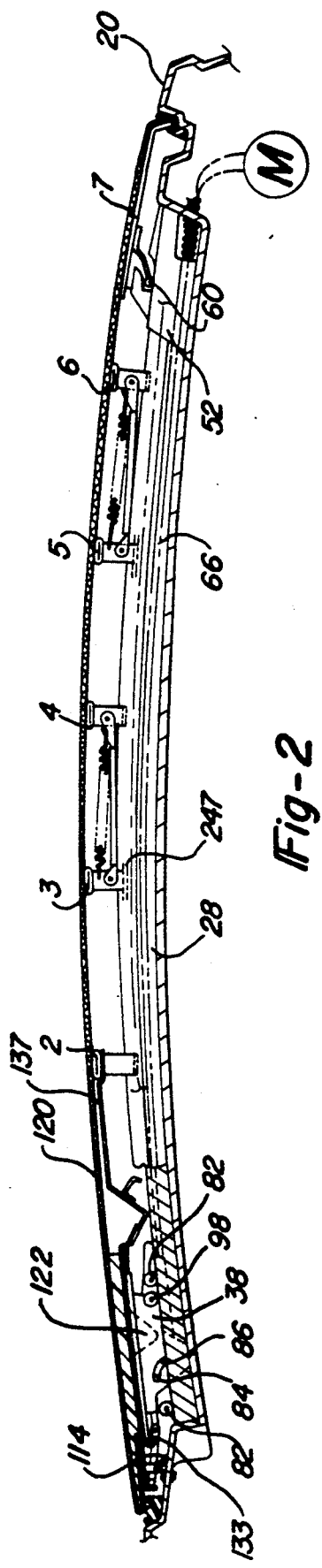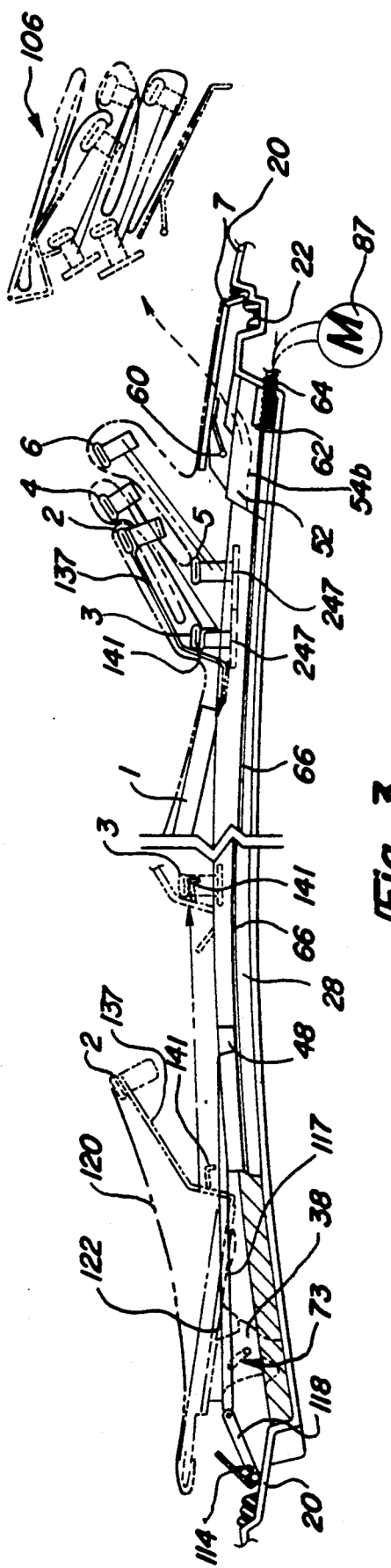

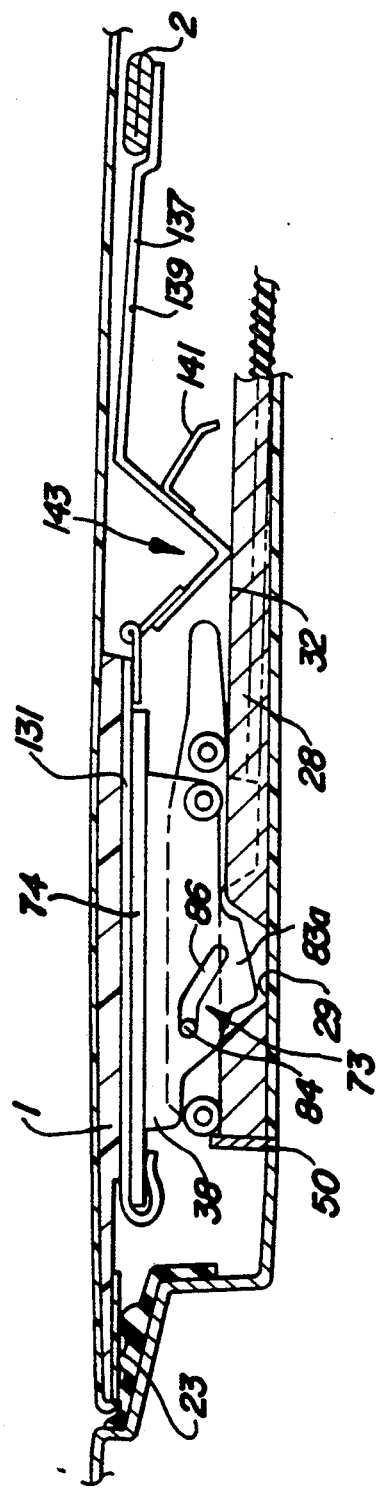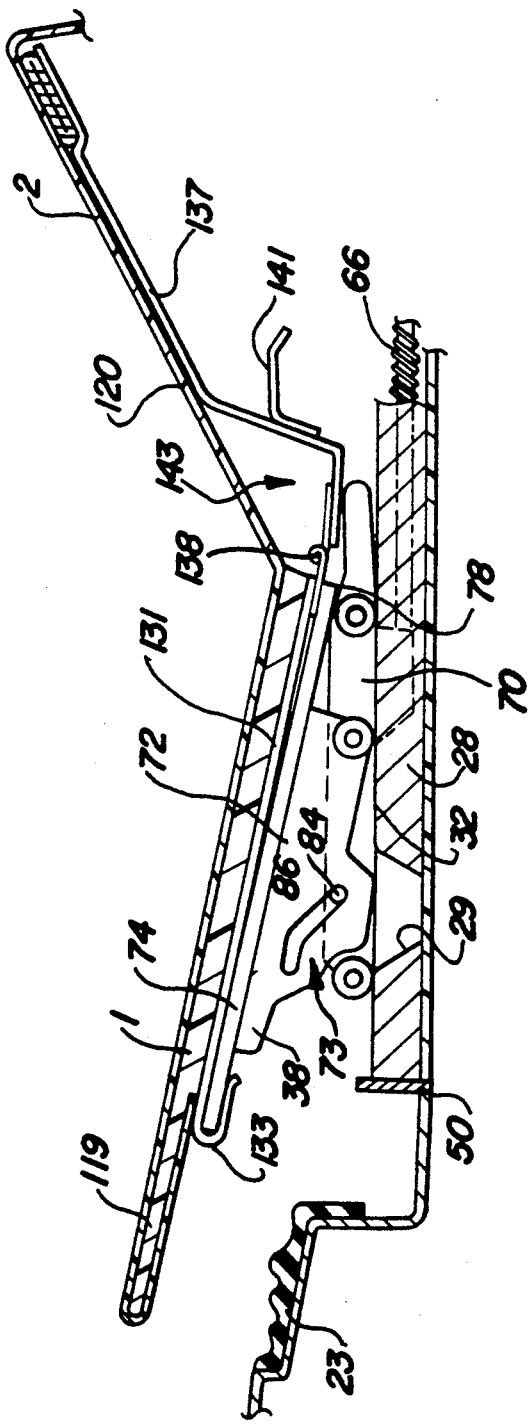

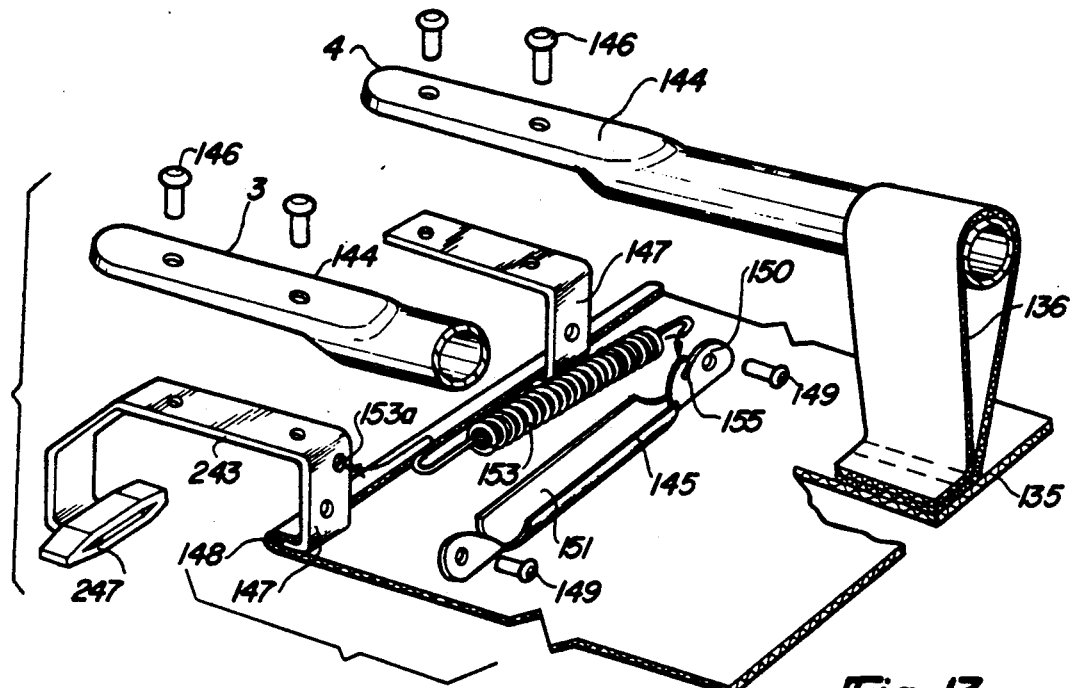
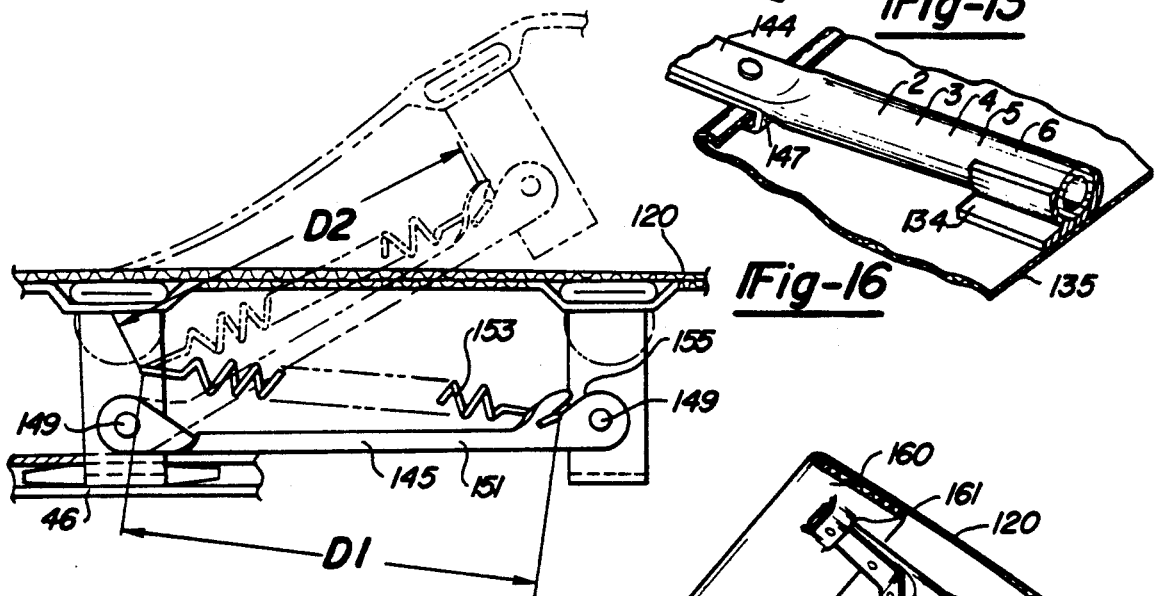
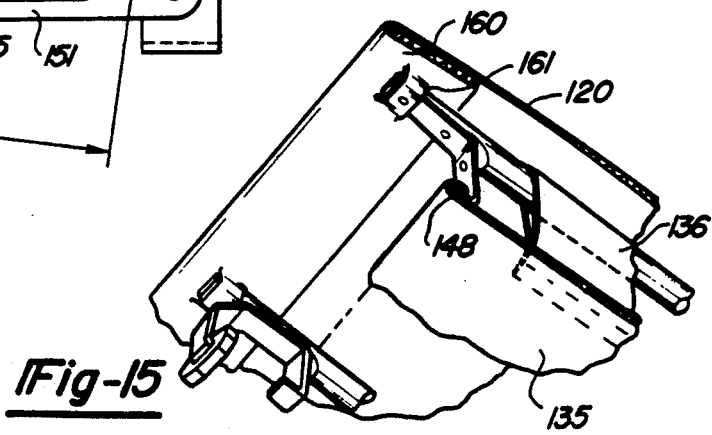

SLIDABLE, FOLDABLE, AND REMOVABLE VEHICLE SUNROOF

BACKGROUND OF THE INVENTION

1. Field of the Invention

The present invention relates generally to vehicle-type sunroofs or similar type closures for openings formed in a vehicle. More particularly, the present invention relates to folding sunroofs which are slidable between open and closed positions and are completely removable from the vehicle top.

2. Description of the Prior Art

In the vehicle sunroof art there are known examples of retracting and folding sunroofs utilizing fabric covers. While these roofs often provide an advantage over rigid panel retracting sunroofs in that they provide an increased opening of the vehicle roof structure, no provision is made for the removability of the fabric top or the direction of air flow over the retracted fabric. As a result there are accumulated bunches of folded fabric at the rear end of the vehicle roof. This accumulation of fabric, and the attendant sunroof structures, decreases the available roof opening, exposes the fabric to wind force degradation during high speed motoring, and may cause unwanted noise.

For Example, U.S. Pat. No. 3,658,378 issued in 1972 to Sutren discloses a retractable folding sunroof having alternate free and guided roof bows connected through a torsion arm and slide-block mechanism. A reduction-geared motor, carried by the front header of the retracting roof, drives a pinion along a toothed, fixed side rail for movement of the roof. Seating of the front header to effect closure thereof is accomplished through downward extending side rails.

U.S. Pat. No. 4,209,196 issued in 1980 to Mocelin discloses a retractable folding sunroof mounted on surved bows and being driven by a reduction geared motor carried by the retracting front header. An eccentric cam assembly is spring loaded to affect seating of the front header during closure of the roof.

Neither of these folding roofs provides for removal of the roof panel or a wind deflector assembly to prevent air flow over the retracted fabric. Further, due to the aforementioned increased opening of the vehicle roof structure, a large wind deflector blade is necessary to provide adequate wind deflection over substantially the entire roof. Such a large wind deflector blade may be esthetically unappealing if allowed to retract into the vehicle passenger compartment and functionally undersirable if left above the vehicle roof skin at all times.

The present invention solves the aforementioned problems of fabric accumulation by providing for removal of a retracting folding fabric roof panel at the option of the vehicle operator. All drive means for retraction of the folding roof panel are located in a fixed roof frame structure affixed to the vehicle so that the fabric panel may be removed therefrom and folded for storage away from the vehicle roof. Further, a wind deflector is incorporated within the roof structure to automatically deploy from a concealed position during roof opening to guide air flow over the vehicle passenger compartment and the accumulated retracted fabric, thereby reducing passenger discomfort caused by air flow into the passenger compartment and reducing air flow into the retracted and retained fabric to reduce noise and fabric wear.

SUMMARY OF THE INVENTION

The present invention comprises a fixed roof structure assembly having a frame with guide tracks affixed to the lateral sides thereof in recessed areas, and drive means mounted to the frame, and a removable panel assembly for covering a roof aperture, the panel being retractable to uncover the aperture. In an automated embodiment the drive means will include a motor, preferably located at the rearward portion of the frame and mounted interiorly of the vehicle so as to be protected from the elements.

Helical cables, i.e., cables having a spiral groove on the surface thereof, or the like, are driven within the guide tracks to affect movement of guide shoes contained within the guide tracks. The removable panel assembly is then moved by the guide shoes.

A wind deflector is pivotally affixed to the frame at a forward end thereof and stowed by the removable panel assembly when the panel assembly is closed. Upon opening of the panel assembly the wind deflector deploys to an operable position to guide air movement over the passenger compartment and roof structure located rearwardly of the deflector.

The retracting, foldable, removable, panel assembly generally comprises a rigid front header to which the fabric of the panel is affixed. The front header is removably attached to the guide shoes.

The panel assembly further comprises a series of bows attached to the fabric of the panel that are located rearwardly of the front header. These bows are alternately free to rise upwardly to collect slack fabric upon retraction, i.e., opening, of the panel; and are guided in the lateral guide tracks to provide an accordion-like pleating of the retracted panel.

A removable rear header is releasably affixed to the frame at a rearward portion thereof. The rear header has the roof panel fabric affixed thereto and is a part of the removable roof panel.

The roof panel may be retracted and left with the roof panel folded and retained by the fixed roof structure assembly or the roof panel may be completely removed and stored elsewhere, such as within the vehicle.

BRIEF DESCRIPTION OF THE DRAWINGS

FIG. 1 is a top perspective view of the device according to the present invention.

FIG. 2 is a side elevation of the device in the closed position taken along the line 2—2 of FIG. 1.

FIG. 3 is a side elevation showing the device in various stages of retraction and removal.

FIG. 11 is a side elevational cross section of the front header and guide shoe in the closed position.

FIG. 12 is a side elevational cross section of the front header and guide shoe in the open position.

FIG. 13 is an exploded view of a guided bow-to-free bow connection.

FIG. 14. is a side view of a guided bow-to-free bow connection.

FIG. 15 is a bottom perspective view of the top cloth and headliner attachments.

FIG. 16 is a perspective view showing an alternative means for attaching the headliner to a bow.

DESCRIPTION OF THE PREFERRED EMBODIMENT

Figure 4:
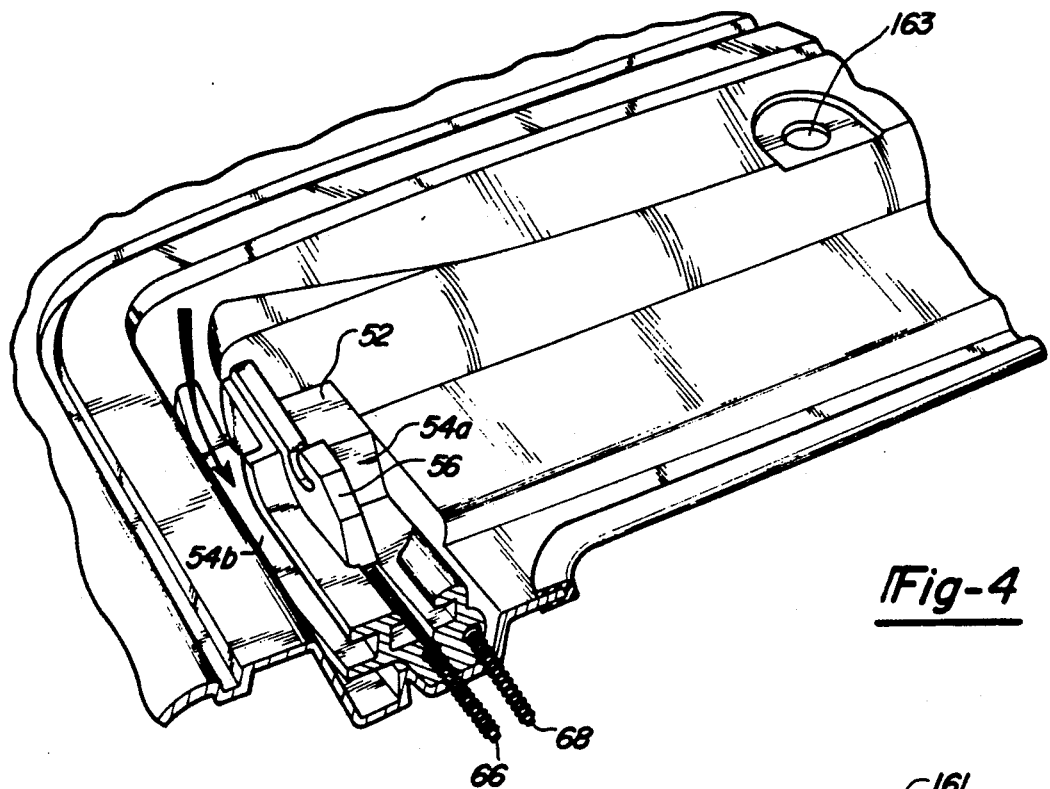
FIG. 4 is a perspective view of the rearward fixed structure roof assembly of the device.

As seen in FIG. 1 the sliding, folding, removable vehicle cover 100 comprises a fixed roof structure assembly 104 and a removable panel assembly 106. The preferred embodiment is illustrated as an automobile sunroof but the invention is not limited to that application.

The fixed roof structure assembly 104 further comprises a frame 20 attached to a vehicle 21, the frame having a trough, or depression, 22 formed therein and a large central aperture 24 for opening the passenger compartment of the vehicle to the elements. Deformable seals 23, as best seen in the sectional illustrations, are provided at all necessary edges of the fixed roof structure 104 to provide a sealing contact with the removable panel assembly 106, thereby protecting the passenger compartment of the vehicle from the elements. The trough 22 extends around the periphery of the aperture and provides attachment points for both removable and fixed pieces of the sunroof assembly 100. As all panel assembly 106 pieces are ultimately attached through the trough 22 it will be appreciated that the panel assembly 106, when closed, presents a low profile substantially in the plane of the roof frame 20. The trough 22 will also serve as a water channel for any moisture penetrating the removable panel assembly 106.

Affixed to the roof frame 20 within the trough 22 on the sides of the roof frame 26, 26' are guide tracks 28. As the guide tracks 28 and their associated subassemblies function in identical manner, although in mirror image, only one such guide track 28 and associated components will be described, unless otherwise indicated.

Figure 8:
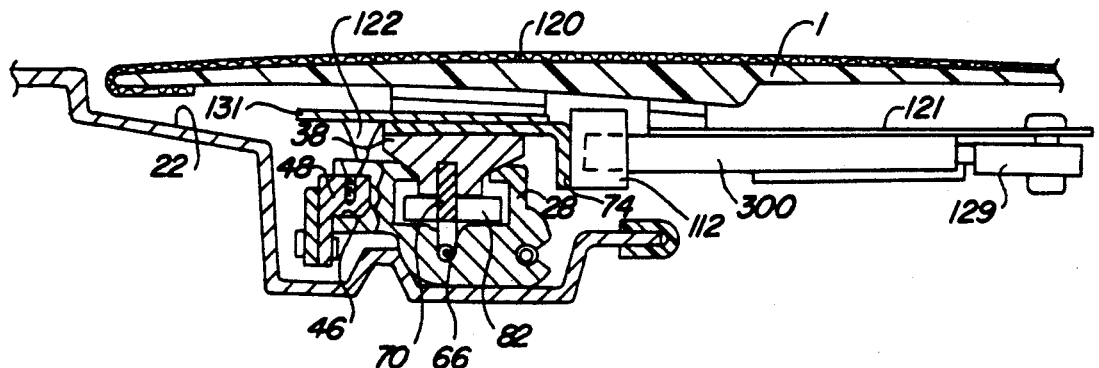
FIG. 8 is a cross section of the device taken at line 8—8 of FIG. 1.
Figure 9:
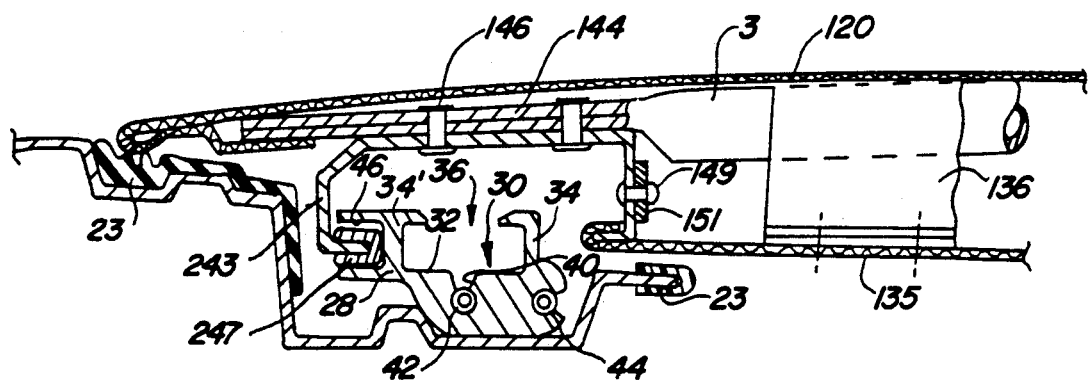
FIG. 9 is a cross section of the device taken at line 9—9 of FIG. 1.
Figure 10:
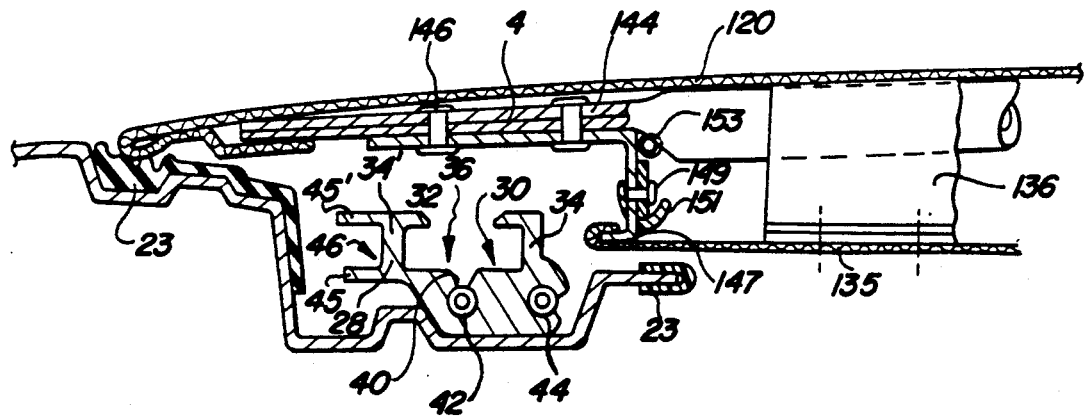
FIG. 10 is a cross section of the device taken at line 10—10 of FIG. 1.

As seen in FIGS. 8-10, the guide track 28 is generally an extruded metal piece having a central channel 30 substantially formed by a channel bottom surface 32 and two inverted "L"-shaped side arms 34, 34'. The central channel 30 is open at the top surface thereof between the side arms 34, 34' at top channel opening 36. It will be understood that positional words such as top, bottom, front, back, horizontal, etc. are used in their ordinary sense in relation to an automotive-type vehicle unless otherwise indicated. The top channel opening 36 allows a guide shoe 38 to slide therethrough, as seen in FIG. 8, thus propelling the panel assembly 106 as more fully explained below.

The central channel bottom surface 32 has an opening 40 communicating with a drive cable race 42 located therebeneath. A slack cable race 44 into which the opposite side drive cable will retract upon rearward motion of the guide shoe 38 is located next to the guide cable race 42. On the outboard side of the guide track 28, i.e., that side distal from a center line of the vehicle, is located a lateral channel 46. The lateral channel 46 is formed by extensions 45, 45' of the guide track 28 and retains a wind deflector guide foot 48 and guided bows 3, 5 of the panel assembly as more fully explained below.

Figure 5:
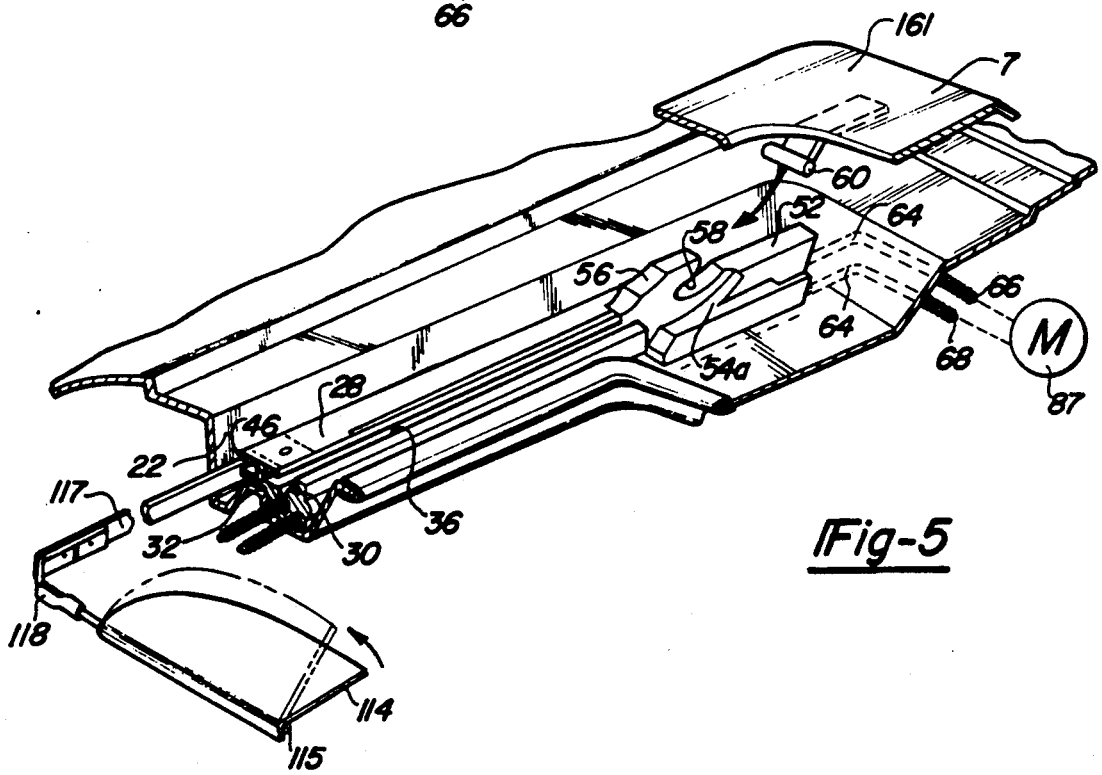
FIG. 5 is a cut-away perspective view of the device showing the wind deflector of the device.

As best seen in FIGS. 11 and 12 a stop plate 50, is located at the forward end of the guide track 28 to arrest the forward motion of the guide shoe 38 thus forming a means for blocking forward movement of the guide shoe 38 and if necessary to seal the guide track 28 at the forward end. Also located at the front end of the guide track 28 is a guide flange detent 29, or cavity, in the channel bottom surface 32, providing means for positively sealing the front header 1 in the closed position against the elements in cooperation with a lost motion connector 73. A backstop 52, detailed in FIGS. 4 and 5, is located at the rear end of the guide track 28. The back stop 52 is generally cube shaped and seals the rear of the guide track 28 with a plane face at the backstop 52, providing a means for blocking rearward movement of the guide shoe 38.

Guide surfaces 54a, 54b are formed on the inboard and outboard side, respectively of the backstop 52. The guide surfaces slope upwardly from front to back in an arc to aid in the insertion and removal of fabric gathering bows 2, 3, 4, 5, 6, thereby providing means for facilitating insertion and removal of the panel assembly 106 as more fully explained below. A hinge arm 56 is formed on the top surface of the back stop 52 and overlies the top surface to form a rearwardly opening cavity 58 for receiving a hinge pin 60 of the rear header 7. In the lower portion of the back stop 52 are formed circular bores 62 which anchor one end of each drive cable housing 64 and permit movement of the drive cables 66, 68 therethrough into the guide track cable races 42, 44.

Figure 7:
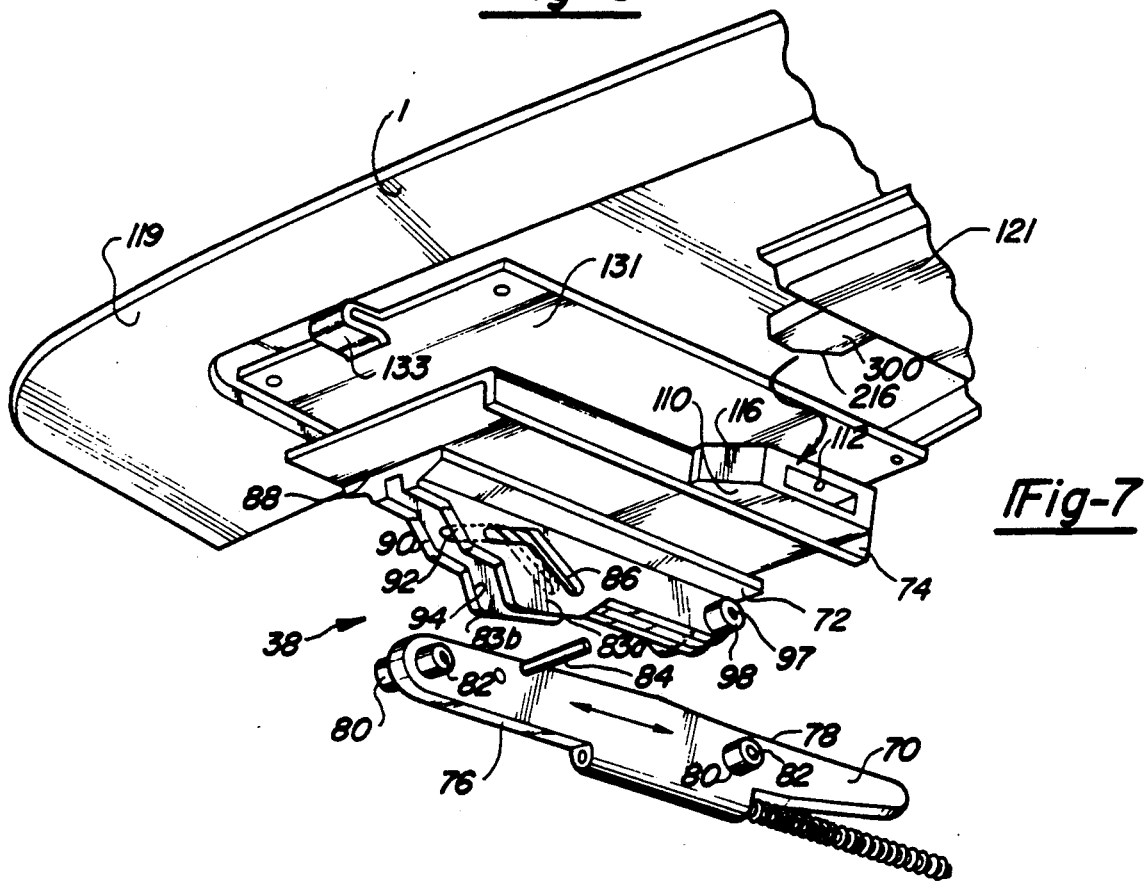
FIG. 7 is a detail perspective view of the guide shoe and front header.

As seen in FIG. 7, the guide shoe 38, is a three piece assembly comprising a wheeled base 70, a tilt plate 72, and a carrier plate 74.

The wheeled base 70 is a basically rectangular plate 76 having a thin cross-sectional area and a ramped surface 78 at the rearward portion thereof. At each side of the base 70, base wheels 80 are affixed to axles 82 attached to the plate 76 at the lower portion thereof. The base wheels contact the guide track 28 in the central channel 30 to allow for a sliding, or rolling, movement of the guide shoe 38 within the central channel 30. Although not shown, other suitable sliding means, such as lubricated guide blocks, may be utilized as alternatives to wheels. A pin 84 is located at the forward upper portion of a side of the wheeled base 70 to retain the tilt plate 72 by fitting within an "S" shaped slot 86 formed on a side surface of the tilt plate 72. This pin-in-slot arrangement forms a lost motion connector 73 allowing, in concert with the ramped base rear surface 78, the tilt plate 72 to deflect upwardly from the horizontal as explained further below. The lost motion connector 73 in concert with the guide flange detent 29, provides means for sealing the front header 1 in the closed position, as previously mentioned. A drive cable 66 is then affixed by suitable means to the rear portion of the wheeled base 70, to provide motive means for the guide shoes 38.

The tilt plate 72 comprises a horizontal surface 88 extending above the guide track 28 and two vertical side legs 90, 92 extending into the guide track, the side legs 90, 92 having a channel 94 therebetween allowing the tilt plate 72 to fit over the wheeled base 70. On each side leg is affixed an axle 97 and wheel 98 located at a rear lower portion thereof. These wheels 98, and the base wheels 80 cooperate together to define means for sliding the guide shoes within the central channel responsive to a means for moving the guide shoe as more fully explained below. The tilt plate wheels 98 allow the tilt plate 72 to roll freely when it is deflected up from the horizontal position. Side legs 90, 92 further form, on a bottom surface thereof, bottom flanges 83a, 83b fittable within the guide flange detent 29 to arrest forward motion of the guide shoe 38 and lower the guide shoe 38 toward the horizontal to affect a sealing of the vehicle roof against the elements.

An "S" shaped slot 86 is formed in a side leg 92 at a forward portion thereof. The "S"-shaped slot has a horizontal channel and a rearwardly and downwardly sloping channel. The "S"-shaped slot 86 fits over the wheeled base pin 84 thereby providing a lost motion connector 73 between the wheeled base 70 and the tilt plate 72.

As shown in FIG. 2, the drive cable 66 is driven by an electric motor 87, or the like, having a geared rotary shaft contacting a helical groove on the face of the cable 66. The cable and motor arrangement is well known in the art as are manual versions thereof. These elements cooperate to define a means for moving the guide shoe 38 on the guide track 28. When the drive cable 66 is moved in the rearward direction, the wheeled base 70 moves therewith drawing the base pin 84 down and through the "S"-shaped slot 86 with a resulting movement of the tilt plate forward portion upward from the horizontal with the rearward portion of the tilt plate 72 moving downwardly over the wheeled base ramped surface 78. A forward motion of the drive cable 66 will result in forward motion of the wheeled base 70, but moving the tilt plate 72 from its deflected position back to the horizontal only when sufficient resistance to forward movement is encountered such as when bottom flanges 83a, 83b drop into guide flange detent 29 and the tilt plate 72 reaches the stop plate forward 50 of the guide track 28. It will be seen that the travel of the "S" shaped slot 86 equals the distance between the stop plate 50 and the detent 29.

As shown in FIG. 7, a generally rectangular carrier plate 74 is affixed by screws or the like, to the tilt plate horizontal surface 88, or may be formed integrally therewith. On that side of the carrier plate 74 proximal to the midline of the vehicle, or inboard side, is affixed a receiving block 110 having a cavity 112 formed therein for the reception and holding of a front header latch 300. A surface 116, or surfaces, of the receiving block may be angled correspondingly with a surface 216 of the front header latch 300. The angled surfaces 116, 216 provide for an easily sliding insertion of the latch 300 into the receiving block cavity 112, to thereby releasably connect the removable panel 106 to the guide shoe 38 through a front header 1. The guide shoe 38, motor 87, and cable 66 cooperate to define means for driving the retractable panel assembly 106, as further explained below.

As seen in FIGS. 1 and 5, the wind deflector 111 comprises a deflector blade 114 pivotally affixed to deflector hinges 113 located at the front of the vehicle in trough 22, through a deflector mounting bar 115 securely affixed to the underside of the deflector blade 114. The deflector blade 114 is spring loaded or otherwise biased towards its operable, i.e., wind deflecting, position. A link arm 117 is pivotally attached at one end to the wind deflector 111 through a substantially right angled deflector arm 118 and is fixedly attached to the lateral channel 46 at the other end through a pivotal connection 302 secured to lateral channel 46 by screws or the like fastened through a deflector guide foot 48.

Figure 6:
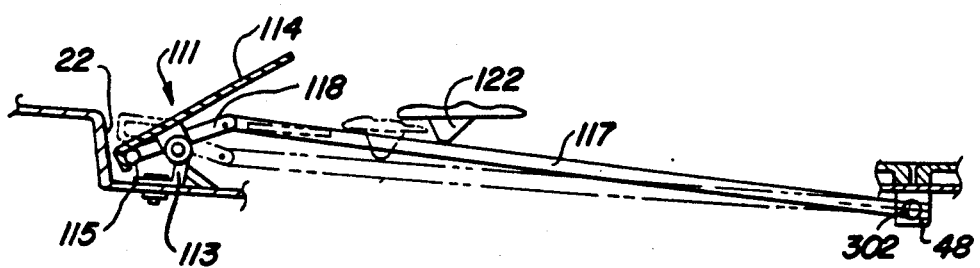
FIG. 6 is a detail of the wind deflector in open and closed positions.

As the deflector blade 114 is deployed to the operable position, as seen in FIG. 6, a portion of the link arm 117 rises above the guide track 28 due to the pivotal connections among the pieces. Play may be provided in the link arm-to-deflector arm connection if necessary. This arrangement provides for automatic closure of the wind deflector 111 upon closure of the panel assembly 106 and contact with clip plate deflector cam 122 as more fully explained below.

The wind deflector blade is larger than would ordinarily accompany a rigid sliding roof panel, due to the necessity of deflecting wind over the aperture in the fixed frame 104, when the removable panel assembly 106 is retracted to an aperture open position.

Figure 6A:
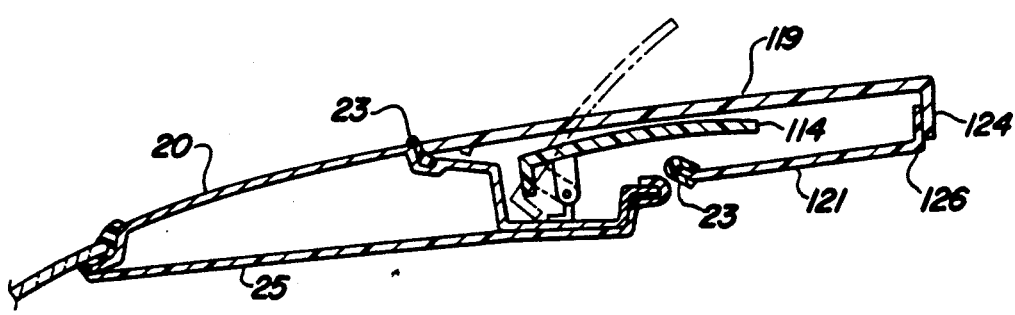
FIG. 6A is a cross section view of the wind deflector blade and front header taken along the line 6A—6A of FIG. 1.

As shown in FIG. 6A, the wind deflector blade 114 is stowed in a concealed position within the front header 1 when the removable panel assembly 106 is in an aperture closed position. Concealment of the wind deflector blade 114 accomplishes both esthetic and functional purposes. Esthetics of the vehicle passenger compartment are improved when the deflector blade does not intrude therein, and aerodynamics as well as esthetics are improved by not having an unnecessary wind deflector remaining above the removable panel assembly 106 when it is in the aperture closed position. The underside of the fixed frame 20 abutting the front header 1 may be covered with a matching fabric 25 to further improve the vehicle passenger compartment esthetics.

THE REMOVABLE PANEL ASSEMBLY

As seen in FIGS. 1, 7 and 8, the front header 1 generally comprises a rigid top plate 119 to which the top fabric 120 is securely attached, a connected bottom plate 121 and associated attachment means for joining the front header 1 to the guide shoes 38.

As shown in FIG. 6A, the bottom plate 121 is affixed to the top plate 119 at a portion of the top plate rearward surface through a respective flange members 124, 126 of each plate 119, 121 which extends towards the opposite plate being secured together by welding, screws, or the like. In the preferred embodiment, the stowed wind deflector blade 114 will fit between top plate 119 and bottom plate 121. As seen in FIG. 1, the bottom plate 121 has affixed thereto a manually operated latch assembly 125. The latch assembly comprises a turn wheel 127 (or a similar device such as a latch handle or solenoid) which operates side arms 129, 129a in a known manner to lock in or withdraw front header latch 300 from the receiving block cavity 112 located on the guide shoe 38.

As shown in FIG. 7, further attachment between the front header 1 and the guide shoe 28 to enhance the tilting efficacy of the front header 1 is affected by means of a clip plate 131 affixed to the front header lower surface. The clip plate 131 is a generally flat rectangular plate having a rearwardly opening spring clip 133 on the downward facing side thereof and a deflector cam 122 for closing the wind deflector 111. The clip plate 131 opposes the top surface of the guide shoe carrier plate 74 and is affixed thereto by means of spring clip 133 grasping the carrier plate 74.

The bottom plate 121 of the front header further anchors a headliner sheet of fabric 135, as shown in FIGS. 8 and 9, which generally separates the removable panel assembly 106 components from the underlying passenger compartment of the vehicle.

The front header 1 may be considered the front, or first, positional bow of an alternating series of guided and free riding bows supporting the fabric of the removable panel for certain purposes of description, although being structurally unique from the subsequent bows 2–6. The front header 1 and the bows 2–6, together with their associated linkages, cooperate to define means for gathering the fabric of the removable panel when the panel is retracted to open the roof aperture 24. In the illustrated embodiment guided bows 1, 3, 5 are in one, three, and five positions; while free riding bows 2, 4, 6 are in the two, four, and six positions; the rear header 7 laying rearward of the sixth bow 6.

As seen in FIG. 2, alternate guided and free riding bows are ganged together for substantially constant spacing thereof. As best seen in FIGS. 11 and 12, the front header 1, considered now as the first bow, has pivotally attached thereto at the rearward end of the clip plate 131 a bow link arm 137 connecting the first and second bows 1, 2.

The bow link arm 137, seen in side view, is generally "V"-shaped with a long extension arm 139 extending horizontally off the top of the rearward leg of the "V" to reach the underside of the second bow 2 to raise the second bow during opening of the panel 106. A second, short extension 141 also extends rearwardly from the rearward leg of the "V" about halfway up that leg. This short extension 141 will contact the guided third bow 3 upon retraction of the panel 106, when the bow link arm 137 is in the raised position as shown in FIG. 3. The bow link arm 137 is pivotally attached at the tops of the forward leg of the "V" to the clip plate 131.

As seen in FIG. 12, due to this pivotal attachment 138 the long extension arm 138 will rise as the carrier plate 74 and tilt plate 72 rearward portions tilt downwardly under the action of the lost motion connector 73 as drive cable 66 draws the wheeled base 70 rearwardly, and the "V" section 143 of bow/link arm 137 is forced upwardly therewith. As the pin 84 proceeds rearwardly in "S" shaped slot 86 the "V" section 143 is forced further upwardly by contact with the rear portion of the ramped surface 78 of the wheeled base 70.

As seen in FIG. 13, the fabric carrying bows, 2, 3, 4, 5, 6, exclusive of the front header 1, are generally tubular with flattened end pieces 144 at the outboard ends thereof. The top fabric 120 is stretched over the bows 2–6 and fastened to the flattened end pieces 144 by slits 161 located in folded over and seamed side portions of the fabric 160.

The top fabric 120 is further securely attached by glue or the like to both the front header 1 and the rear header 7. The third bow 3 is held, i.e., guided, as seen in FIGS. 13 and 14, in the guide rails by a bracket 243 affixed thereto, as by rivets 146 to the flat portion 144 of the bow, and extending into the lateral channel 46. A bow guide foot 247 is attached to an end of the bracket 243 and rests within the lateral channel 46 to aid the sliding of bracket 243, and hence the third bow 3, along the guide track 28. It will be noted that the bow guide foot 247 is of a length to abut the next guided bow's guide foot to maintain a proper spatial relationship between the guided and free bows when the panel 106 is in the retracted position.

The free riding fourth bow 4 is attached to the fixed third bow 3 by means of a spring tensioned link arm 145 pivotally affixed to each bow 3, 4 at a headliner clip 147 secured to each bow 3, 4. The headliner clip 147 is an "U" shaped flange affixed by rivets 146 or the like to, and extending downwardly from, each bow 2, 3, 4, 5, 6, at an end portion 144 thereof. The downward portion is then an "L" shaped clip with the short leg of the "L" facing the guide track 28.

As seen in FIGS. 13 and 14, pivot pins 149 secure each end of a channeled link arm 151 to the respective headliner clips 147. A tensioning spring 153 is then secured at an aperture 153a through the guided headliner clip to a cut out 155 located on the free bow end portion 150 of the channeled link arm 151 at a tensioned distance D1. The tensioning spring 153 biases the free fourth bow 4, which does not have an attached bracket 243, and is therefore unrestrained, into a raised position at an untensioned distance D2 of the spring 102, above the guide tracks 28 when the the tension of the top fabric 120 is released by retraction of the removable panel 106, as seen in FIG. 14.

The structure of the rearwardly placed alternate guided and free bows, 5 and 6 respectively, is identical to that of the third and fourth bows.

As seen in FIG. 13, the headliner 135 is preferably a piece of foldable fabric, and is attached to the headliner clips 147 of the bows 2–6, through slits 148 in a folded and stitched lateral portion of the headliner and is further secured to the panel assembly 106 through loops 136 extending over the bows 2–6. As shown in FIG. 16, alternatively, the headliner 135 may be attached to the bows 2–6 by means of a resilient, snap-on U-shaped clip 134 fittable over the bow and fastened by stitching or the like to the headliner 135. This snap-on clip 134 may hold the headliner 135 closer to the bows 2–6 than would the loops 136, thereby providing more headroom within the passenger compartment when the removable panel assembly 106 is in an aperture closed position. Further, when attached by snap-on clips 134 the headliner may be easily removed from the bows 2–6 in a nondestructive fashion if access is needed to the overlying removable panel assembly 106 structures. The headliner 135 is further secured to the front and rear headers, 1 and 7 respectively, by gluing or the like.

As shown in FIGS. 1, 2 and 3, the rear header 7 is located at the rearmost end of the removable panel assembly 106. The rear header comprises: a rigid plate 161; with two spaced locking pins 162 affixed to the central, rearward, under-surface thereof; and two hinge pins 60, one affixed to each forward, lateral, under-surface of the plate 161 for engagement with the hinge arm 56 of the guide track back stops 52. The locking pins 162 fit through holes 163, as seen in FIG. 4, formed in the rear of trough 22 to be secured therein by manually operated lock arms 164 located on the underside of the frame 20, as shown in phantom in FIG. 1. The locking pins 162, lock arms 164, hinge pins 60, and hinge arms 56, together with the latch assembly 125, clip plate 131 and guide shoe 38, cooperate to define means for attachment and removal of the retractable panel assembly 106 to the fixed roof structure 104.

A cable drive motor 87 is affixed to the central rear portion of the underside of frame 20 for protection from the elements. Drive cable housings 64 are provided to protect and route each helical drive cable 66, 68 to its drive cable race 42 and slack cable race 44. The helical drive cables 66, 68 are gear driven in a known manner by the cable drive motor 87 forwardly into the drive cable race 42 and rearwardly into the slack cable race 44.

To retract the removable panel assembly 106 and open the roof aperture 24 to the elements, the vehicle operator will activate the motor 87 by closing an electrical switch (not shown), or if desired by manually turning a crank handle (not shown), to move the helical drive cables 66, 68.

In the preferred panel retracting/aperture opening operation the drive cables 66, 68 are driven by cable drive motor 87 rearwardly from the closed roof position. Drive cable 66 moves wheeled base 70 up from its guide flange detent 29 fully onto central track bottom surface 32. Further rearward motion of the wheeled base 70 moves pin 84 downwardly through "S" shaped slot 86 causing the carrier plate 74 to tilt upwardly from rear to front, thus lifting the attached front header 1 from its sealed position in pressing contact with the frame seals 23 and the frame 20. Clip plate deflector cam 122 is thus lifted and further rearward movement of the wheeled base moves the guide shoe 38 into contact with bow link arm 137 raising bow link arm 137 and the free second bow 2 above the roof plane to capture the slack top fabric 120 created by retraction of the front header 1.

Further rearward movement of the guide shoe causes the bow link arm shorter extension 141 to abut the third guided bow 3 and force the rearward movement thereof. The free fourth bow 4 then rises above the roof plane due to the upward bias of spring tensioned link arm 145, thereby capturing the further slackened top fabric 120. This process is repeated as fixed third bow 3 abuts fixed fifth bow 5 and moves it rearwardly.

As guide shoe 38 tilts above the horizontal and moves rearwardly, wind deflector 111 is allowed to rise to the operable position under the bias of springs (not shown), as the downward pressure on the deflector blade 114 and the deflector link arm 117 supplied by the front header 1 is removed therefrom. The cable drive motor 87 may incorporate automatic stop means upon full retraction of the top fabric 120, i.e., when the guide shoe 38 hits the back stop 52. In the retracted position, as shown in FIG. 3, the top fabric is pleated much like a drapery with the free bows extended above the roof plane and the fixed bows lying in the roof plane.

Closure is simply the reverse actions applied to the opening of the roof, with the top fabric 120 tension drawing the free bows downwardly. As front header clip plate 131 approaches the wind deflector link arm 117 which is ramped partly above the lateral channel 46, clip plate deflector cam 122 engages the deflector link arm 117 and forces the link arm, 117 and thus the deflector blade 114, into the horizontal position to be stowed beneath the front header 1.

Should the operator desire to remove the removable panel assembly 106 from the vehicle, this is accomplished from the closed position by retracting the front header 1 slightly to release the tension on the top fabric 120. The front header 1 is then disconnected from the guide shoes 38 by turning turn wheel 127, withdrawing each front header latch 300 from its respective guide shoe receiving block cavity 112, and disconnecting each clip plate spring clip 133 from its respective guide shoe carrier plate 74 by pushing forward on the front header 1. The rear header locking pins 162 are then released by releasing the manually operated lock arms 164 and the rear header 7 is lifted from the fixed roof structure assembly 104. The removable panel assembly 106 is then retracted manually, with the bows 2–6 and front header 1, exiting rearwardly over the backstop 52. The panel assembly may be folded upon itself during removal to make an unobstrusive package for storing.

Upon reinsertion of the bows 2–6 into the guide track 28, ramped guide surfaces 54a, 54b are provided on the backstop 52, to smoothly guide the bows 2–6 into the proper orientation for reinsertion. The front header 1 is then reattached to the guide shoe 38 and the rear header 7 is secured to the frame 20. The roof panel is then ready for motorized operation.

Having thus described the invention what is claimed is:

1. A slidable, foldable, removable fabric cover device for a vehicle comprising:
   (a) a fixed structure assembly including:
      1. a frame attached to the vehicle and having an aperture therein;
      2. means for driving a retractable panel assembly to aperture open and aperture closed positions, the driving means affixed to the frame;
   (b) a retractable panel assembly attachable to the fixed structure assembly and having aperture open and aperture closed positions, including:
      1. a foldable fabric sized to cover the aperture when the panel assembly is in the closed position;
      2. a front header attached to the fabric;
      3. means for gathering the fabric when the panel assembly is in the aperture open position;
      4. a rear header for releasably anchoring the fabric to the fixed roof structure assembly rearward of the front header, at least one of the front header and rear header having means for releasable attachment to the drive means; and
      5. means for removal of the retractable panel assembly from the vehicle.

2. The vehicle cover of claim 1 wherein the frame further comprises:
   a convex rigid shell having a trough formed therein surrounding the aperture to provide attachment surfaces for at least a portion of the drive means thereby placing an attached retractable panel assembly in an aperture closed position substantially coplanar with the frame.

3. The vehicle cover according to claim 1 wherein the drive means further comprises:
   (a) a guide track,
   (b) a movable guide shoe located within the guide track, and,
   (c) means for moving the guide shoe within the guide track.

4. The vehicle according to claim 3 wherein the guide track further comprises:
   (a) a central channel which receives and retains the guide shoe, the channel having a lower surface and a longitudinal axis,
   (b) a lateral channel located to a side of the central channel, and
   (c) a cable race communicating with the central channel.

5. The vehicle cover according to claim 4 wherein the guide track further comprises:
   (a) means for blocking forward movement of the guide shoe,
   (b) means for blocking rearward movement of the guide shoe,
   (c) a detent in the forward area of the lower surface of the central channel for reception of a portion of the guide shoe, and (d) means for facilitating removal and reinsertion of at least a part of the retractable panel assembly.

6. The vehicle cover according to claim 4 wherein the guide shoe further comprises:
 (a) means for sliding the guide shoe within the central channel responsive to the means for moving the guide shoe, and
 (b) means for tilting at least a portion of the guide shoe into a plane angled from the longitudinal axis of the guide track.

7. The vehicle cover according to claim 5 wherein the guide shoe further comprises:
 (a) a wheeled base having:
  1. a substantially rectangular base plate lying in a vertical plane,
  2. wheels affixed to the base plate,
  3. a base pin extending from a side of the base plate, and
  4. means for attachment to the guide shoe moving means;
 (b) a tilt plate having:
  1. a vertically extending portion, the vertically extending portion having;
   i. side legs fittable over the wheeled base,
   ii. a rearwardly and downwardly extending slot formed therein fitting over the base pin,
   iii. a bottom flange extendable below the wheeled base and fittable within the central track cavity, and
  2. a horizontal portion located above the guide track having means for releasable attachment to the front header.

8. The vehicle cover according to claim 3 wherein the guide shoe moving means further comprises:
 (a) an electric motor having a rotating shaft,
 (b) a helical cable, and
 (c) a gear mounted on the rotating shaft drivingly contacting the helical cable, the helical cable being attached to the guide shoe.

9. The vehicle cover according to claim 7 wherein the front header further comprises:
 (a) a convex rigid top plate,
 (b) a rigid bottom plate attached to the rigid top plate, the rigid bottom plate having a latch assembly for affixing the front header to the tilt plate,
 (c) clip plates having means for further affixing the front header to the tilt plate, the clip plate being affixed to a rigid portion of the front header,
 (d) means for moving a wind deflector located forwardly of the front header when the front header moves from an aperture open position to an aperture closed position.

10. The device according to claim 3 wherein the rear header further comprises:
 (a) a rigid plate securely affixed to the top fabric, and
 (b) means for releasably attaching the rigid plate to the fixed structure assembly.

11. The vehicle cover according to claim 10 wherein the rear header further comprises:
 (a) locking pins securely affixed to the underside of the rigid plate, the pins insertable into the frame, and
 (b) hinge pins abuttable to the guide track.

12. The vehicle cover according to claim 3 wherein fabric gathering means further comprises:
 (a) guided bows and free bows,
  1. the guided bows and free bows spaced alternately along the guide track and attached to the top fabric,
  2. the guided bows being placed forward of the respective alternative free bows, and
 (b) means for attaching the guided bows to the respective free bows, the attachment means including means for biasing the free bows to a position vertically spaced from the guided bows.

13. The vehicle cover according to claim 12 wherein the guided bow attaching means further comprises:
 a spring biased link arm pivotally attached to the guided bow and free bow.

14. The vehicle cover according to claim 12 wherein the guide shoe further comprises:
 means for abutting a free bow located rearwardly thereof, the abutting means including means for vertically spacing the free bow from the guided bows and further abutting a guided bow located rearwardly of the free bow located rearward of the guide shoe.

15. The vehicle cover according to claim 12 wherein the guide bows are retained in the lateral channel by guide bow feet which abut each other on retraction of the retractable panel assembly.

16. The vehicle cover according to claim 5 wherein the facilitating means further comprises:
 a block located at the rear of the guide track, the block having at least one ramped surface opening to a free space above the sunroof.

17. The vehicle cover according to claim 16 wherein the rear header, when attached to the fixed structure, physically separates the space above the sunroof and the facilitating means.

18. The vehicle cover according to claim 9 wherein the fixed structure assembly further comprises
 a wind deflector comprising a generally rectangular rigid plate, the wind deflector:
  (a) being pivotally attached to the roof frame,
  (b) having means for biasing the wind deflector plate to an operable wind deflecting position,
  (c) having means for stowing the wind deflector beneath at least a portion of the front header in a non-operable position,
  (d) having means for automatic placement of the wind deflector into the non-operable position when the retractable panel assembly is changed from an aperture open to an aperture closed position.

19. The vehicle cover according to claim 18 wherein the wind deflector placement means further comprises:
 a link arm located on the outboard side of the guide track and pivotally attached to a portion of the wind deflector at a first end thereof, and
 pivotally attached at a second end thereof to the lateral channel of the guide track;
 whereby the link arm is raised upwardly from the second end to the first end when the wind deflector is in the operable position, and the deflector arm is forced to a non-angled position in relation to the guide track by the front header wind deflector moving means thereby placing the wind deflector in the non-operable position.

20. The vehicle cover according to claim 19 wherein the link arm is non-slidably pivotally attached at the second end to the lateral channel of the guide track and pivotally attached at the first end to a rigid deflector arm extension of the wind deflector.

21. The vehicle cover according to claim 1 wherein the retractable panel assembly further comprises:
   a headliner of foldable fabric attached to the retractable panel assembly, so as to substantially physically separate the retractable panel assembly from an interior compartment of the vehicle; and,
   means for attaching the headliner to the retractable panel assembly.

22. The vehicle cover according to claim 21, wherein the headliner attachment means further comprises:
   resilient clips attached to the headliner for frictionally engaging the fabric gathering means.

23. A slidable, foldable, removable fabric cover device for a vehicle aperture comprising:
   (A) a fixed structure assembly attachable to the vehicle, the structure having a cavity and means for driving a retractable panel assembly to cover the aperture;
   the panel driving means including a guide shoe comprising:
      a. a movable base plate having:
         1. a substantially rectangular plate lying in a vertical plane,
         2. at least one bearing affixed to the base plate,
         3. a base pin extending from a side of the base plate, and
         4. means for attachment to a motive source;
      b. a tilt plate having;
         1. a vertically extending portion, the vertically extending portion having;
            i. side legs fittable over the movable base,
            ii. a rearwardly downwardly extending slot formed therein fitting over the base pin,
            iii. a bottom flange extendable below the movable base and fittable within the fixed structure assembly cavity,
         2. a horizontal portion located above the side legs having means for releasable attachment to a retractable panel assembly,
   (B) a retractable panel assembly attachable to the driving means and being carried thereon, the panel assembly having:
      a. a fabric cover, and
      b. means for folding the fabric cover; and
   (C) means for removing the panel assembly from the driving means.

24. A slidable, foldable, removable fabric cover device for a vehicle aperture comprising:
   (a) a frame attachable to the vehicle at the peripheral of the vehicle aperture,
   (b) a retractable panel assembly attachable to the frame and having aperture open and aperture closed positions, the retractable panel assembly including:
      1. a foldable fabric sized to cover the aperture when the panel assembly is in the closed position,
      2. a front header attached to the fabric, the front header having means for attachment to a means for driving the retractable panel,
      3. means for gathering the fabric when the panel assembly is in the aperture open position,
      4. a rear header anchoring the fabric at a periphery of the vehicle aperture rearward of the front header,
   (c) means for driving a retractable panel assembly to aperture open and aperture closed positions, and
   (d) means for removal of the retractable panel assembly from said frame.

25. The vehicle cover according to claim 24 wherein the driving means of part (c) therein is attached to the frame.

26. A slidable, foldable, removable fabric cover device for a vehicle aperture comprising:
   (a) a frame attachable to the vehicle at the peripheral of the vehicle aperture,
   (b) a retractable panel assembly attachable to the frame and having aperture open and aperture closed positions, the retractable panel assembly including:
      1. a foldable fabric sized to cover the aperture when the panel assembly is in the closed position,
      2. a front header attached to the fabric, the front header having means for attachment to a means for driving the retractable panel, the means for attachment being releasable,
      3. means for gathering the fabric when the panel assembly is in the aperture open position,
      4. a rear header anchoring the fabric at a periphery of the vehicle aperture rearward of the front header,
   (c) means for driving a retractable panel assembly to aperture open and aperture closed positions, and
   (d) means for removal of the retractable panel assembly from the vehicle.

27. A slidable, foldable, removable fabric cover device for a vehicle aperture comprising:
   (a) a frame attachable to the vehicle at the peripheral of the vehicle aperture,
   (b) a retractable panel assembly attachable to the frame and having aperture open and aperture closed positions, the retractable panel assembly including:
      1. a foldable fabric sized to cover the aperture when the panel assembly is in the closed position,
      2. a front header attached to the fabric, the front header having means for attachment to a means for driving the retractable panel,
      3. means for gathering the fabric when the panel assembly is in the aperture open position,
      4. a rear header anchoring the fabric at a periphery of the vehicle aperture rearward of the front header, the rear header having a means for releasably anchoring the fabric to the aperture periphery.
   (c) means for driving a retractable panel assembly to aperture open and aperture closed positions, and
   (d) means for removal of the retractable panel assembly from the vehicle.

28. A slidable, foldable, removable fabric cover device for a vehicle aperture comprising:
   (a) a frame attachable to the vehicle at the peripheral of the vehicle aperture;
   (b) a retractable panel assembly attachable to the frame and having aperture open and aperture closed positions, the retractable panel assembly including:
      (1) a foldable fabric sized to cover the aperture when the panel assembly is in the closed position;
      (2) a front header attached to the fabric, the front header having means for attachment to a means for driving the retractable panel;
      (3) means for gathering the fabric when the panel assembly is in the aperture open position;
      (4) a rear header anchoring the fabric at a periphery of the vehicle aperture rearward of the front header;

(c) means for driving a retractable panel assembly to aperture open and aperture closed positions;
(d) means for removal of the retractable panel assembly from the vehicle; and
(e) a wind deflector blade attached to the frame having an operable upwardly deflected position when the retractable panel assembly is in an aperture open position, and
a stowed position wherein the wind deflector blade is stowed within a front header when the retractable panel assembly is in an aperture closed position.

* * * * *

UNITED STATES PATENT AND TRADEMARK OFFICE
CERTIFICATE OF CORRECTION

PATENT NO. : 5,018,783

DATED : May 28, 1991

INVENTOR(S) : Antony W. Chamings et al

It is certified that error appears in the above-identified patent and that said Letters Patent is hereby corrected as shown below:

Column 1, line 38, "surved" should be -- curved --.

Column 1, lines 51-52, "undersirable" should be -- undesirable --.

Column 3, line 9, "14." should be -- 14 --.

Column 6, line 56, "28" should be -- 38 --.

Column 7, line 36, "138" should be -- 139 --.

Column 8, line 17, delete "the" (third occurrence).

Column 14, line 46, "." should be -- , --.

Signed and Sealed this

Sixteenth Day of February, 1993

Attest:

STEPHEN G. KUNIN

*Attesting Officer*   *Acting Commissioner of Patents and Trademarks*